3,316,149
ANTIBIOTIC SHOWDOMYCIN AND A METHOD OF PRODUCING SAME

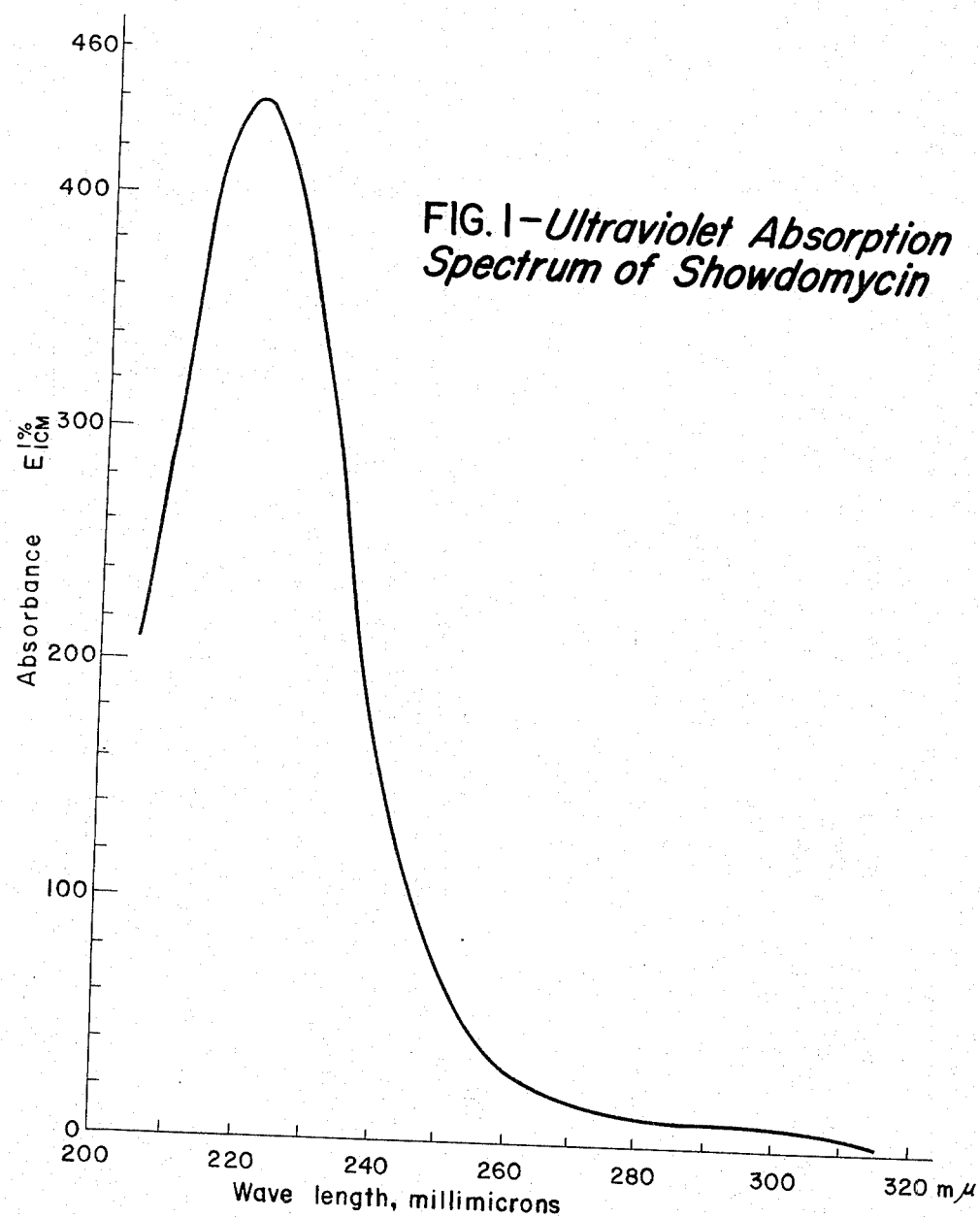

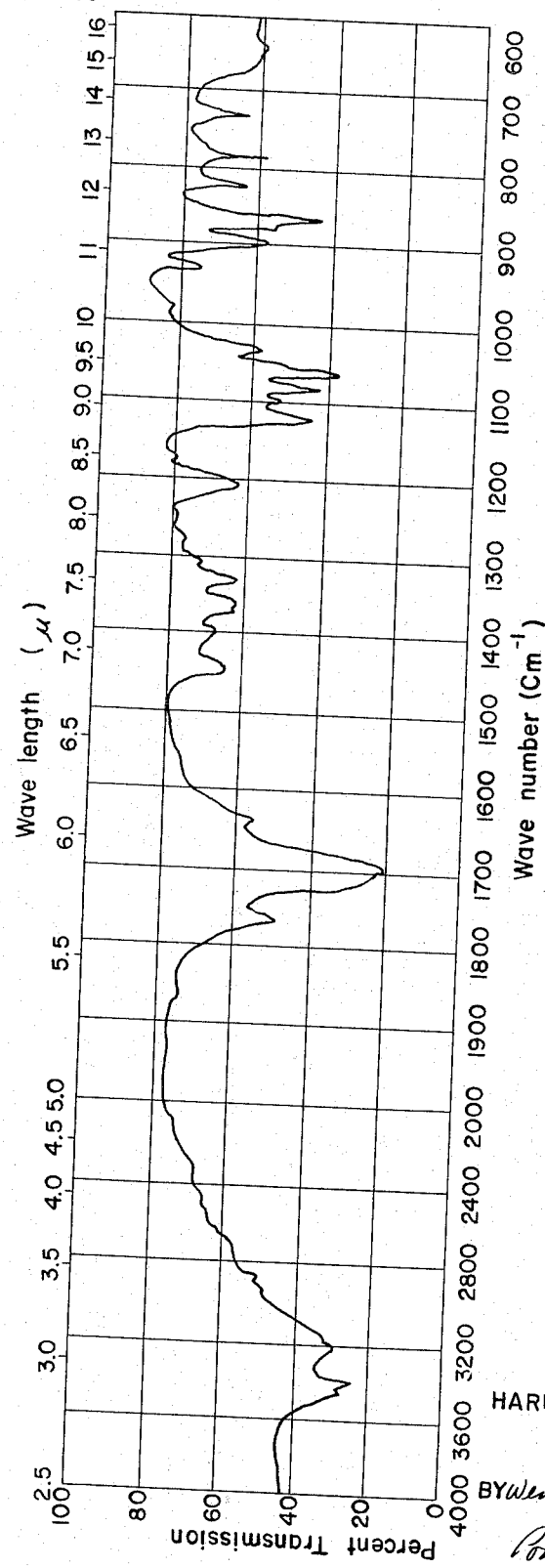
FIG.2 - Infrared Absorption Spectrum of Showdomycin

Haruo Nishimura, Ashiya-shi, Japan, assignor to Shionogi & Co., Ltd., Osaka, Japan
Filed Nov. 19, 1963, Ser. No. 325,524
10 Claims. (Cl. 167—65)

The present application is a continuation-in-part of copending application, Ser. No. 303,360, filed Aug. 20, 1963, now abandoned.

This invention relates to a useful antibiotic designated "showdomycin" and, more particularly, to its production by fermentation, to methods for its recovery and concentration from crude solutions, such as fermentation broths, and to processes for its purification. The invention includes within its scope the antibiotic in dilute forms, as crude concentrates, and in pure crystalline forms. These novel products are especially useful in combating pathogenic microorganisms.

In the course of search for new antibiotics, a streptomyces species indexed Z-452 in the collection of Shionogi and Co., Ltd., Osaka, Japan, and on deposit with the American Type Culture Collection under the accession number ATCC No. 15105 has been found to produce a mixture of antibiotics. When grown in a suitable medium, at least four different antibiotics are produced. Separating the mycelium from the fermentation broth by filtration, one of the antibiotics, which belongs to the actinomycin-type judging from the summarized paper-bioautography (Ishida et al.: J. Antibiotics, vol. 4, p. 510 (1951)) and the electrophoretic paper-bioautography (Takahashi et al.: J. Antibiotics (B), vol. 7, p. 81 (1954)), is present primarily in the mycelium mat whereas the other three antibiotics, one of which belongs to the macrolide-type and two belong to an unknown type judging from the above mentioned paper-bioautographies, are present principally in the filtrate. The antibiotic with which this invention is concerned is one of the unknown type antibiotics extracted from the filtrate.

Streptomyces Z-452 has been isolated from a soil sample collected at Shodo Island, Kagawa Prefecture, Japan, and shows the following microbiological characteristics.

Morphological characteristics

The morphological property of the strain was observed according to the agar-cylinder culture method (Nishimura et al.: J. Antibiotics (A), vol. 10, p. 277 (1957)) after 14 days' incubation at 28° C. and detailed observations of the spores were made by the aid of electron microscope. The sporophores are straight to flexuous and branch in tuft. The spores are formed in chain. The shape of spores is cylindrical and the surface smooth covering with thin membrane.

Cultural characteristics

The observation was made through a 14 days' incubation period at 28° C. The results are shown in the following table:

Growth response to temperature: Good growth and sporulation at 28° and 37° C. No growth at 45° C.
Growth type on glucose broth: Ring type (typical).

| Medium | Growth | Sporulation | Colour | | |
|---|---|---|---|---|---|
| | | | Aerial mycelium | Substratum mycelium | Soluble pigment |
| Synthetic agar (Glycerol-Czapek's agar) | Good | Good powdery | White | Pale yellowish brown | None. |
| Glucose-asparagine agar | Moderate | Moderate | Yellowish white to yellowish. | do | None to pale yellow orange. |
| Calcium malate agar | do | Moderate, powdery. | Yellowish gray | do | None to pale yellowish brown. |
| Starch agar | Good | Good, powdery | Brownish white to light brownish gray. | do | None. |
| Glucose-Czapek solution | Moderate | Moderate | Yellowish gray to light brownish gray. | Light brownish gray | Do. |
| Nutrient agar | do | do | Brownish white | Grayish yellow brown | Yellowish brown. |
| Glucose-peptone agar | do | Poor | Light brownish gray | Yellowish brown to dark yellowish brown. | Dark yellowish brown. |
| Glucose-bouillon agar | Good | Moderate | Light brownish | Brown | Grayish yellow brown. |
| Potato | Good, wrinkled | None | None, surface moist | Dark brownish gray | Dark brownish gray. |
| Czapek's agar | Poor | Poor | Grayish white | Yellowish gray | None. |
| Tyrosine agar | Good | Good | Yellowish gray to light brownish gray. | Dark yellowish brown | Dark yellowish brown. |
| Glucose broth | Moderate | None | None | Light brownish gray | Yellowish brown. |

Physiological characteristics

The observation was made after incubation at 28° C. for 14 days, unless otherwise indicated. The results are shown in the following table:

Test:

| | Result |
|---|---|
| Acid formation from glucose-peptone (10 days incubation at 28° C.) | Positive |
| Melanoid pigment | Positive |
| Tyrosinase reaction | Positive |
| Starch hydrolysis | Positive |
| Nitrate reduction | Positive |
| Gelatin liquefaction (slow) | Positive |
| Milk peptonization (strong) | Positive |
| Cellulase reaction | Negative |

The utilization of carbon sources on the basal medium of Pridham and Gottlieb by the organism after 14 days' incubation at 28° C. is shown in the following table wherein the marks "+" and "++" indicate increasing utilization, the mark "—" no utilization and the mark "±" doubtful utilization:

Carbon source:

| | | Result |
|---|---|---|
| d-Glucose | good growth | ++ |
| Lactose | do | ++ |
| Galactose | do | ++ |
| d-Xylose | do | ++ |
| d-Mannose | fair growth | + |
| d-Fructose | do | + |
| Maltose | do | + |
| Salicin | do | + |
| 1-arabinose | do | + |
| Sucrose | faint growth | ± |
| Inositol | do | ± |
| Mannitol | no growth | — |
| Rhamnose | do | — |
| Rhaffinose | do | — |
| Sorbitol | do | — |
| Inulin | do | — |
| Dulcitol | do | — |

From the results of these observations, the characteristics of Streptomyces Z-452 are summarized as follows: Sporophores are straight to flexuous in tuft, surface of spores smooth and spores cylindrical. Growth type on glycose broth is ring type. Acid production from glucose is positive. Colour of aerial mycelium is white to yellowish gray, substratum mycelium pale yellowish brown and no soluble pigment produced on synthetic media. Colour of aerial mycelium is brownish white to light brownish gray, substratum mycelium and soluble pigment are brown on organic media. Melanoid pigment and tyrosinase reaction are positive. Reduction of nitrate is positive.

Among many species of streptomyces described in Bergey's "Manual of Determinative Bacteriology," Waksman and Lechevalier's "Actinomycetes and Their Antibiotics," Waksman's "The Actinomycetes" and other literatures, Streptomyces Z-452 appears to be closely related to *Streptomyces antibioticus* by morphological properties (straight in tuft) and some biochemical characteristics such as melanoid pigment (positive), tyrosinase reaction (positive), starch hydrolysis (positive) and gelatin liquefaction (positive). However, it differs from *Sreptomyces antibioticus* in the points of color of aerial mycelium, substratum mycelium and diffusible pigment on various media and carbon-utilization pattern as shown in the following table:

there is a microorganism isolated from a soil sample collected at Nishinomiya, Hyogo Prefecture, Japan, which is indexed C-224 in the collection of Shionogi and Co., Ltd., Osaka, Japan, and on deposit with the American Type Culture Collection under the accession number ATCC No. 15227. This microorganism shows substantially the same microbiological behavior as the above described standard strain of *Streptomyces showdoensis* n. sp. but with a difference in utilization of rhamnose on the basal medium of Pridham and Gottlieb after 14 days' incubation at 28° C. Thus, the strain ATCC 15105 shows no utilization of rhamnose, while the strain ATCC 15227 gives faint growth ($\pm$).

In accordance with one aspect of the present invention, the new antibiotic showdomycin is produced during cultivation of the microorganism, *Streptomyces showdoensis* n. sp., in an aqueous nutrient medium at a temperature of about 25 to about 32° C., preferably 27 to 29° C., under aerobic conditions. The composition of this nutrient medium may be varied over a very wide range. Essentially what is required is a carbon source, a nitrogen source and trace inorganic elements. Examples of suitable carbon sources are starch, glucose, glycerol, dextrin, maltose, fructose, sucrose, lactose and molasses. Suitable sources of nitrogen for the fermentation process include meat extracts, peptone, corn steep liquor, soybean meal, peanut meal, wheat gluten, cotton seed flour, casamino acid (acid

| Properties | Streptomyces Z-452 | *Streptomyces antibioticus* NRRL B-546 |
| --- | --- | --- |
| Czapek's agar: | | |
|   AM | Grayish white | Brownish gray. |
|   SM | Yellowish gray | Brownish gray to dark brownish gray. |
| Glucose asparagine agar: AM | Yellowish white to yellowish gray | Brown to grayish brown. |
| Starch agar: SM | Pale yellowish brown | Gray to dark olive gray. |
| Calcium malate: | | |
|   AM | Yellowish gray | Light gray. |
|   SM | Pale yellowish brown | Dark purplish gray. |
|   SP | None to pale yellowish brown | Purplish gray. |
| Glucose-peptone: | | |
|   AM | Light brownish gray | White. |
|   SM | Yellowish brown | Dark brownish gray. |
| | Dark yellowish brown | None. |
| Glucose-bouillon: AM | Light brownish gray | Grayish white. |
| Nutrient agar: | | |
|   Sporulation | Good | Poor. |
|   AM | Brownish white | Grayish white. |
|   SM | Grayish yellow brown | Pale yellowish brown. |
|   SP | Yellowish brown | None to pale brown. |
| Tyrosine agar: | | |
|   AM | Yellowish gray to light brownish gray | Pale pink becoming pale brown. |
|   SM | Dark yellowish brown | Dark purplish gray to dark gray. |
|   SP | do | Dark bluish gray to dark gray. |
| Potato plug: | | |
|   AM | None | None. |
|   SM | Dark brownish | Olive gray, becoming grayish yellow brown. |
|   SP | Dark brownish gray | Do. |
| Utilization of carbon sources: | | |
|   Sucrose | Faint to no growth ($\pm$) | Good growth (++). |
|   Rhamnose | No growth (−) | Fair growth (+). |
|   Arabinose | Faint to no growth ($\pm$) | Do. |
|   Sorbose | No growth (−) | Good growth (++). |

*Note.*—AM: aerial mycelium. SM: substratum mycelium. SP: soluble pigment.

Thus, the microoragnism has been designated a new species and named *Streptomyces showdoensis* n. sp.

It is to be understood that for the production of showdomycin the present invention is not limited to the use of *Stretomyces showdoensis* n. sp. It is especially desired and intended to include the use of natural or artificial mutants or variants produced from the described organism. The artificial production of mutants or variants may be accomplished by a conventional operation such as X-rays, ultraviolet radiation and nitrogen mustards.

It is also to be understood that for the production of showdomycin this invention is not restricted to the use of a standard strain of *Streptomyces showdoensis* n. sp., i.e. ATCC 15105. It is desired and intended to include the use of strains which conform to hte same species of the above standard strain. As an example of such strains, hydrolyzate of casein), NZ amine (enzymatic hydrolyzate of casein), yeast extracts, ammonium sulfate, ammonium carbonate and ammonium chloride. Examples of suitable sources of inorganic elements are mineral salts such as sodium chloride, potassium chloride, calcium carbonate and potassium phosphate. The nutrient medium may or may not be adjusted to about pH 5.0 to 7.0 prior to inoculation of the microorganism. The pH tends to remain rather constant during the fermentation but, if variations are encountered, a buffering agent such as calcium carbonate may be added to the medium. Generally speaking, the pH may be kept between 4.5 and 7.5, preferably between 5.0 to 5.5 during the fermentation. If excessive foaming is encountered, anti-foaming agents such as vegetable oils, lard oil and polypropyleneglycol may be added to the fermentation medium prior to or in the course of the fermentation. The maximum yields of the antibiotic showdomycin can be obtained within about 20 to about 60 hours, usually about 25 to about 50 hours, of fermentation under optimum conditions of temperature and aeration.

After growth of the microorganism, the mycelium is removed from the fermentation broth by using standard equipment such as filter-presses and centrifuges, and then the antibiotic showdomycin is recovered from the filtrate by a conventional separation procedure such as a solvent extraction procedure and an adsorption procedure. Prior to recovery of the antibiotic, the filtered broth may be required to be adjusted to a pH between 3.0 and 6.0, preferably from 4.0 to 5.0, because the antibiotic is relatively unstable in a neutral or alkaline medium. The recovery operation is preferred to be executed at a relatively low temperature not over around 70° C. A high temperature around 100° C. results in a great loss of activity. Suitable extraction solvents include methanol, ethanol, butanol, acetone, dimethylformamide and dioxane. Examples of suitable adsorbents are Hyflo Super-Cel (diatomaceous earth), silica gel, silicic acid and activated carbon. A combination of a solvent extraction procedure and an adsorption procedure is usually adopted. For instance, the acidified filtrate is combined with an adsorbent and then filtered. The collected adsorbent is eluted with a suitable organic solvent to extract the antibiotic. The extract may be concentrated or treated with an organic solvent which can difficultly dissolve the antibiotic, as petroleum ether, ether and benzene, to precipitate the crude active component.

The thus-obtained crude active component is further purified by suitable operations such as recrystallization, chromatography and the like. Examples of suitable recrystallization solvents are acetone, butanol, dimethylformamide and dioxane. The preferred chromatographic adsorbents are silica gel, silicic acid and the like.

The antibiotic showdomycin is a white needle crystal melting at 153° C. It is very soluble in water, methanol and ethanol, soluble in acetone, butanol, dimethylformamide and dioxane, but insoluble in petroleum ether, ether and benzene. It behaves as a weak acid.

The average analytical values of showdomycin dried at 100° C. in vacuo to constant weight are as follows: C, 47.31%, H, 5.07%, O, 40.84%, N, 6.06%; no sulfur and halogen. The molecular weight of showdomycin is 230 by the Barger-Akiya method (Akiya et al.: J. Pharm. Soc. Japan, vol. 57, p. 967 (1937)). The above analyses correspond to the molecular formula $C_9H_{11}O_6N$ for showdomycin. The specific rotation of showdomycin is $[\alpha]_D^{22.5} = +49.9°$ ($\pm 3°$) (c.=1% in water). The ultraviolet absorption spectrum in water is characterized by maxima at $$220 \text{ to } 221 \text{ m}\mu \ (E_{1\,cm.}^{1\%} \ 442)$$

(shown in the accompanying drawings, FIG. 1). The infrared absorption spectrum of showdomycin, run as potassium bromide tablet, shows the following frequencies (S=strong, Sh=shoulder, M=mean and W=weak): 3466 (S), 3404 (S), 3234 (S), 3164 (S), 2929 (W), 2906 (W), 2859 (W), 1869 (W), 1773 (S), 1702 (S), 1640 (W), 1502 (M), 1403 (M), 1374 (M), 1362 (M), 1330 (M), 1308 (W), 1280 (W), 1245 (W), 1206 (M), 1175 (W), 1124 (S), 1115 (Sh), 1102 (M), 1084 (S), 1064 (S), 1055 (Sh), 1038 (M), 983 (W), 933 (S), 897 (S), 876 (W), 866 (S), 857 (Sh), 826 (M), 790 (S) and 736 (M) cm.$^{-1}$ (shown in the accompanying drawings, FIG. 2).

It gives positive Elson-Morgan's test. Fehling, Tollen's phloroglucin, Benedict, Molisch, Sakaguchi, anthrone, ninhydrin, biuret, tryptophane-sulfuric acid and maltose reactions are negative, and also an acid hydrolysate gives negative ninhydrin test.

On the basis of the above physical and chemical properties and papergram bioautographs, showdomycin is considered to be new and different from any of the known antibiotics available for comparison.

Showdomycin shows activity against a variety of microorganisms. The in vitro antimicrobial activity of the antibiotic is determined by the agar streak dilution method or by the tube dilution method. A solution of showdomycin is prepared in phosphate buffer pH 5.0 and the pH of the medium is adjusted to 6.0, which are a stable condition for its activity. The results are shown in the following table:

| Test organisms: | Minimum inhibitory concentration, micrograms per millilitre |
|---|---|
| (1) *Shigella dysenterae* | 10 |
| (2) *Shigella paradysenteriae*, Ohara | 20 |
| (3) *Salmonella typhosa* | 50 |
| (4) *Salmonella paratyphi*, A | 50 |
| (5) *Escherichia coli*, Umezawa | 50 |
| (6) *Klebsiella pneumoniae* | 50 |
| (7) *Staphylococcus aureus*, 209P | 50 |
| (8) *Sartina lutea* | 50 |
| (9) *Diplococcus pneumoniae*, type II | 50 |
| (10) *Streptococcus hemolyticus*, D | 2 |
| (11) *Streptococcus hemolyticus*, HA | 2 |
| (12) *Cohynebacterium diphtheriae*, S | 10 |
| (13) *Corynebacterium diphtheriae*, Tront | 10 |
| (14) *Staphylococcus aureus*, 209P | 50 |
| (15) *Mycobacterium tuberculosis* var. *hominis*, H37Rv | 200 |

NOTES

Culture medium is adjusted to pH 6.0; 1–8, beef extract; 9–14, beef extract+10% rabbit blood; 15, Kirchner medium +10% human plasma.

Method of testing: 1–14, agar-streak dilution method; 15, subsurface culture.

End point observed: 1–14, no growth after 24 hours at 37° C.; 15, 50% growth after 3 weeks at 37° C.

From the preceding table, it is seen that the antibiotic is active against both gram-positive and gram-negative bacteria. Especially, it shows a high activity against *Streptococcus hemolyticus*.

Acute toxicity studies on showdomycin were carried out in mice weighing 15 to 16 grams following a 10 day observation period. When treated intraperitoneally, subcutaneously and intraveneously, the median lethal doses (LD$_{50}$) are 25, 18 and 110 milligrams per kilogram of bodyweight, respectively.

The antibiotic showdomycin was also tested against Ehrlich mouse tumor in ascitic form using a so-called contact test technic in vitro. It was found that the antibiotic inhibited a strongly proliferative capacity of the Ehrlich mouse tumor in ascitic form, when the tumor was brought into contact with the antibiotic in a dose of 100 micrograms per millilitre in saline for incubation at 37° C. for 3 hours.

Because of its activity in vitro against transplantable tumor, some preliminary trials of in vivo studies were made on mice, as "standard experimental animals," implanted with the Ehrlich ascites tumor in ascitic form. In this test, mice weighing 16 to 18 grams were given intraperitoneal inoculations of 0.1 millilitre fresh ascitic fluid containing 10 million ascites tumor cells per millilitre. Once daily intraperitoneal treatment of showdomycin was started 24 hours after the inoculation of the ascitic fluid and treatments were continued for 7 consecutive days. The control mice were given saline solution. Ten mice were used in each group. The effectiveness of the antibiotic was evaluated by the survival per cent at the 28th day after inoculation. As the results, showdomycin exhibited a remarkable antitumor, i.e. tumor growth suppressing, activity against Ehrlich ascites tumor in ascitic form: the survival percent of the control is 0 percent and that of an intraperitoneal dose of 5, 10 and 15 milligrams per kilogram is 50, 60 and 50 percent, respectively. In the case of 15 milligrams per kilogram injection, some delayed toxicity is observed, because the average body weight gain of mice is appreciably decreased during the 14 days. It should be noted in this connection, however, that the effectiveness of the antibiotic of the invention in the treatment of human beings has not as yet been proven clinically.

The new antibiotic showdomycin is useful as an agent for inhibiting the growth of gram-positive and gram-negative pathogenic microorganisms. It is useful for sterilizing equipment, for example, surgical instruments. It is also useful in obtaining pure cultures of single microorganisms whereby a susceptible microorganism such as *Streptococcus hemolyticus* may be separated from a resistant one such as *Staphylococcus aureus*.

The following examples are given solely for the purpose of illustration and are not to be construed as limitation of this invention, many variations of which are possible.

Example 1

A nutrient medium is prepared from the following materials:

| | Grams per litre |
|---|---|
| Glycerol | 5 |
| Potato starch | 5 |
| Glucose | 5 |
| Peptone | 4 |
| Potato juice | 4 |
| Sodium chloride | 3 |

After sterilization with steam, the medium is inoculated with *Streptomyces showdoensis* ATCC 15105 and cultivated under aeration for a period of 28 to 49 hours at 28° C. with shaking until the showdomycin concentration reaches 390 to 420 micrograms per millilitre. The antibiotic concentration in the fermentation broth is determined, after dilution of the broth with phosphate buffer of pH 5.0, by the disk or cylinder plate method (Edwin et al.: J. Bacteriology, vol. 59, p. 459 (1945); Nishimura et al.: Annual Report of Shionogi Research Laboratory, No. 11, p. 145 (1961)) on glucose-Simmone's synthetic medium using *Bacillus subtilis*, PCI–219.

The fermentation broth is filtered and the filtrate (15 litres) acidified to about pH 5.0 with 10% hydrochloric acid. To the solution, there is added activated carbon (2 grams per 100 millilitres), and the resultant mixture is filtered with suction. The collected carbon cake is extracted three times with a mixture of water and acetone (2:8) (1.5 litres). The extracts are combined together and the acetone is removed in vacuo. The resulting aqueous solution is extracted three times with butanol (200 millilitres). The butanol extracts are combined together and concentrated to approximately one-fourth of the volume. The concentrated butanol extract is applied to a column of silica gel pretreated with benzene. The column is eluted with a mixture of benzene and acetone (2:8). The eluate is concentrated in vacuo to a small volume so as to precipitate crystals on standing. The crystals are collected by filtration and dissolved in a small amount of a mixture of hot acetone and hot benzene. The resulting solution is allowed to stand overnight at 0° C. The precipitated crystals are collected by filtration and dried to give pure showdomycin (2.2 grams).

Example 2

The fermentation is carried out in the same manner as disclosed in Example 1 but using an aqueous nutrient medium having the following composition:

| | Grams per litre |
|---|---|
| Potato starch | 5 |
| Glycerol | 5 |
| Glucose | 5 |
| Peptone | 5 |
| Calcium carbonate | 3.7 |
| Sodium chloride | 3 |

As the result, the antibiotic concentration in the fermentation broth reaches 380 to 400 micrograms per millilitre within 28 hours from the start of fermentation.

Example 3

The fermentation is carried out in the same manner as disclosed in Example 1 but using an aqueous nutrient medium having the following composition:

| | Grams per litre |
|---|---|
| Potato starch | 10 |
| Glucose | 10 |
| Glycerol | 5 |
| Sodium chloride | 3 |
| Peptone | 2 |
| Ammonium sulfate | 2 |
| Casamino acid | 1 |
| NZ amine | 1 |

As the result, the antibiotic concentration in the fermentation broth reaches 410 to 430 micrograms per millilitre within 45 hours from the start of fermentation.

Example 4

The fermentation is carried out in the same manner as disclosed in Example 1 but using *Streptomyces showdoensis* ATCC 15227.

As the result, the antibiotic concentration in the fermentation broth reaches 420 to 440 micrograms per millilitre within 48 hours from the start of fermentation.

Example 5

The antibiotic showdomycin (5 grams) is dissolved in distilled water (100 litres). The resultant solution is used for washing articles such as surgical instruments and flatwares, followed by sterilization with steam for 30 minutes at 100° C.

Various minor modifications may be made in carrying out the present invention without departing from the spirit and scope thereof.

I claim:

1. A process for producing an antibiotic, which comprises cultivating a showdomycin-producing strain of *Streptomyces showdoensis* in an aqueous nutrient medium under aerobic conditions, and recovering the accumulated antibiotic from the fermentation broth.

2. A process for producing an antibiotic, which comprises cultivating a showdomycin-producing strain of *Streptomyces showdoensis* in an aqueous nutrient medium under submerged aerobic conditions at a temperature of from about 25 to about 32° C. for a period of from about 20 to about 60 hours.

3. A process for producing an antibiotic, which comprises cultivating a showdomycin-producing strain of *Streptomyces showdoensis* in an aqueous nutrient medium under submerged aerobic conditions and recovering showdomycin from the fermentation broth.

4. A process for producing an antibiotic, which comprises cultivating a showdomycin-producing strain of *Streptomyces showdoensis* is an aqueous nutrient medium under submerged aerobic conditions, filtering the fermentation broth, treating the filtrate with an absorbent at a pH between 3.0 and 6.0 and extracting resulting cake of the adsorbent with a suitable solvent.

5. A process for producing an antibiotic, which comprises cultivating a showdomycin-producing strain of *Streptomyces showdoensis* in a aqueous nutrient medium under submerged aerobic conditions, filtering the fermentation broth, treating the filtrate with an absorbent at a pH between 3.0 and 6.0, extracting the resulting cake of the absorbent with a suitable solvent and concentrating the extract at a temperature lower than 70° C.

6. A process for producing an antibiotic, which comprises cultivating a showdomycin-producing strain of *Streptomyces showdoensis* in an aqueous nutrient medium under submerged aerobic conditions, filtering the fermentation broth, treating the filtrate with an adsorbent at a pH between 3.0 and 6.0, extracting the resulting cake of the adsorbent with a suitable solvent and adding a solvent which can difficultly dissolve the antibiotic to the extract whereby the antibiotic is precipitated.

7. A process for producing an antibiotic, which comprises cultivating a showdomycin-producing strain of *Streptomyces showdoensis* in an aqueous nutrient medium under submerged aerobic conditions at a temperature of from about 25 to about 32° C. for a period of from about 20 to about 60 hours, filtering the fermentation broth, treating the filtrate with activated carbon at a pH between 3.0 and 6.0, extracting the resulting cake of the activated carbon with a mixture of water and acetone, evaporating the acetone from the extract, shaking the resultant aqueous solution with butanol, concentrating the butanol extract, chromatographing the concentrated extract on silica gel with subsequent elution with a mixture of benzene and acetone and concentrating the eluate.

8. A process for producing an antiobiotic, which comprises cultivating *Stretomyces showdoensis* ATCC 15105 in an aqueous nutrient medium under aerobic conditions, and recovering the accumulated antibiotic from the fermentation broth.

9. A process for producing an antibiotic, which comprises cultivating *Streptomyces showdoensis* ATCC 15227 in an aqueous nutrient medium under aerobic conditions, and recovering the accumulated antibiotic from the fermentation broth.

10. The antibiotic, showdomycin, effective in inhibiting the growth of gram-positive and gram-negative microorganisms, said antibiotic being a white needle crystal melting at 153° C., containing the elements carbon, hydrogen, oxygen and nitrogen in substantially the following proportions by weight:

| | Percent |
|---|---|
| Carbon | 47.31 |
| Hydrogen | 5.07 |
| Oxygen | 40.84 |
| Nitrogen | 6.06 | having an optical rotation of $[\alpha]_D^{22.5} = +49.9°$ ($\pm 3°$) when dissolved in water (c.=1%), having a molecular formula $C_9H_{11}O_6N$ and a molecular weight of 230 and showing the ultraviolet spectrum and the infrared spectrum as in the attached drawings, FIG. 1 and FIG. 2, respectively.

No references cited.

SAM ROSEN, *Primary Examiner.*

JEROME D. GOLDBERG, *Assistant Examiner.*